US006925168B1

(12) United States Patent
Launders et al.

(10) Patent No.: US 6,925,168 B1
(45) Date of Patent: Aug. 2, 2005

(54) TELECOMMUNICATIONS NETWORK

(75) Inventors: Darren Michael Launders, Suffolk (GB); Simon Alexander Beddus, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/623,317

(22) PCT Filed: Mar. 17, 1999

(86) PCT No.: PCT/GB99/00822
§ 371 (c)(1),
(2), (4) Date: Aug. 31, 2000

(87) PCT Pub. No.: WO99/51014
PCT Pub. Date: Oct. 7, 1999

(30) Foreign Application Priority Data

Mar. 27, 1998 (EP) .......................... 98302396

(51) Int. Cl.[7] .............................................. H04M 1/00
(52) U.S. Cl. ................. 379/355.04; 379/88.23
(58) Field of Search ................. 379/88.23, 88.22, 379/67.1, 88.17, 114.01, 114.13, 355.02, 355.04

(56) References Cited

U.S. PATENT DOCUMENTS

| 4,850,007 A | | 7/1989 | Marino et al. |
| 5,187,735 A | * | 2/1993 | Herrero Garcia et al. ............ 379/88.17 |
| 5,272,748 A | | 12/1993 | Davis |
| 5,448,625 A | | 9/1995 | Lederman |
| 5,937,037 A | | 8/1999 | Kamel et al. |
| 6,009,150 A | * | 12/1999 | Kamel ....................... 379/88.22 |

FOREIGN PATENT DOCUMENTS

DE          4141027 A1     6/1993

* cited by examiner

*Primary Examiner*—Forester W. Isen
*Assistant Examiner*—Jefferey Harold
(74) *Attorney, Agent, or Firm*—Nixon & Vanderhye P.C.

(57) ABSTRACT

In a telecommunications network short dialling codes for a subscriber terminal are programmed by another party, and the allocation of codes is communicated to the user. An audio announcement played as part of the dial tone may be used to communication the allocation of codes.

17 Claims, 4 Drawing Sheets

TELECOMMUNICATIONS NETWORK

BACKGROUND TO THE INVENTION

1. Field of the Invention

The present invention relates to a telecommunications network, and in particular to a network in which subscribers can use short dialling codes.

2. Description of Related Art

It is common practice in networks using modern digital exchanges to provide a facility for customers to use short dialling codes to access frequently dialled numbers. The customer programs the allocation of short dialling codes by dialling out to the local exchange an appropriate sequence of digits. The local exchange records the allocation of codes, and on subsequent calls causes a short code to be translated into the corresponding allocated telephone number.

SUMMARY OF THE INVENTION

According to a first aspect of the present invention, there is provided a method of operating a telecommunications network including:

(a) in response to instructions from a second party remote from a subscriber terminal, pre-programming the network to respond to one or more short dialling codes from the subscriber terminal, (b) communicating to the subscriber data identifying the allocation of short dialling codes pre-programmed in step (a); and (c) subsequently initiating a call from the said subscriber terminal by dialling one of the said short codes.

Although, as noted above, the facility to program short dialling codes has been widely available, it has not been widely used. The present invention significantly increases the ease of use of the short code facility by allowing the allocation of short codes to be pre-programmed by another party, such as the network operator or a service provider connected to the network. This is done moreover without requiring any modification to the standard call control processes. Common call control processes, using the full numbering range of the network, can therefore be used both by subscribers using this service feature, and by other subscribers.

Preferably step (b) includes communicating the said data to the subscriber terminal in an off-hook signal.

The term "off-hook signal" is used to denote a signal played automatically to the user when the terminal is placed in the off-hook state, for example by lifting a telephone handset in order to dial out. This aspect of the invention uses this off-hook signal to indicate to the subscriber the allocation of short codes. This provides a further significant advance in the ease of use of the service by removing the need for the subscriber to remember or record the allocation of codes. At the same time it facilitates the use of centrally-programmed codes, since changes or updates can be readily notified to the subscriber, and serves to prompt the subscriber to use the service. Alternatively or in addition other means may be used to communicate the data identifying the allocation of short codes, for example via a separate data communications network such as the Internet.

Preferably the data communicated to the subscriber may include a paid-for advertisement for goods or services accessed by a telephone number corresponding to one of the said short dialling codes. This preferred feature allows the service to generate extra revenue for the network operator. In return the network may generate a network billing record at a reduced billing rate (reduced, that is, compared to the rate for subscribers not receiving the advertisements) for calls made from the said subscriber terminal.

Preferably the step of pre-programming the network includes programming a number translation platform remote from the subscriber terminal with a plurality of different short dialling code allocations for a plurality of different subscriber terminals. Preferably the method includes transmitting from a management platform to the number translation platform instructions for determining the allocation of short dialling codes, and transmitting from the management platform to a local exchange the said data identifying the allocation of short dialling codes for a respective subscriber terminal.

These preferred features serve to facilitate control and management of the pre-programmed facility in such a way that it can be provisioned for large numbers of subscribers whilst minimising the network overheads associated with the service.

According to a second aspect of the present invention, there is provided a method of operating a telecommunications network, including communicating to a user of a subscriber terminal an off-hook signal which identifies an allocation of short dialing codes for the subscriber terminal.

The invention also encompasses a telecommunications network arranged to operate using a method in accordance with one or more of the preceding aspects.

DESCRIPTION OF THE DRAWINGS

Systems embodying the present invention will now be described in further detail, with reference to the accompanying drawings in which.

DESCRIPTION OF EXAMPLES

Figure 1:
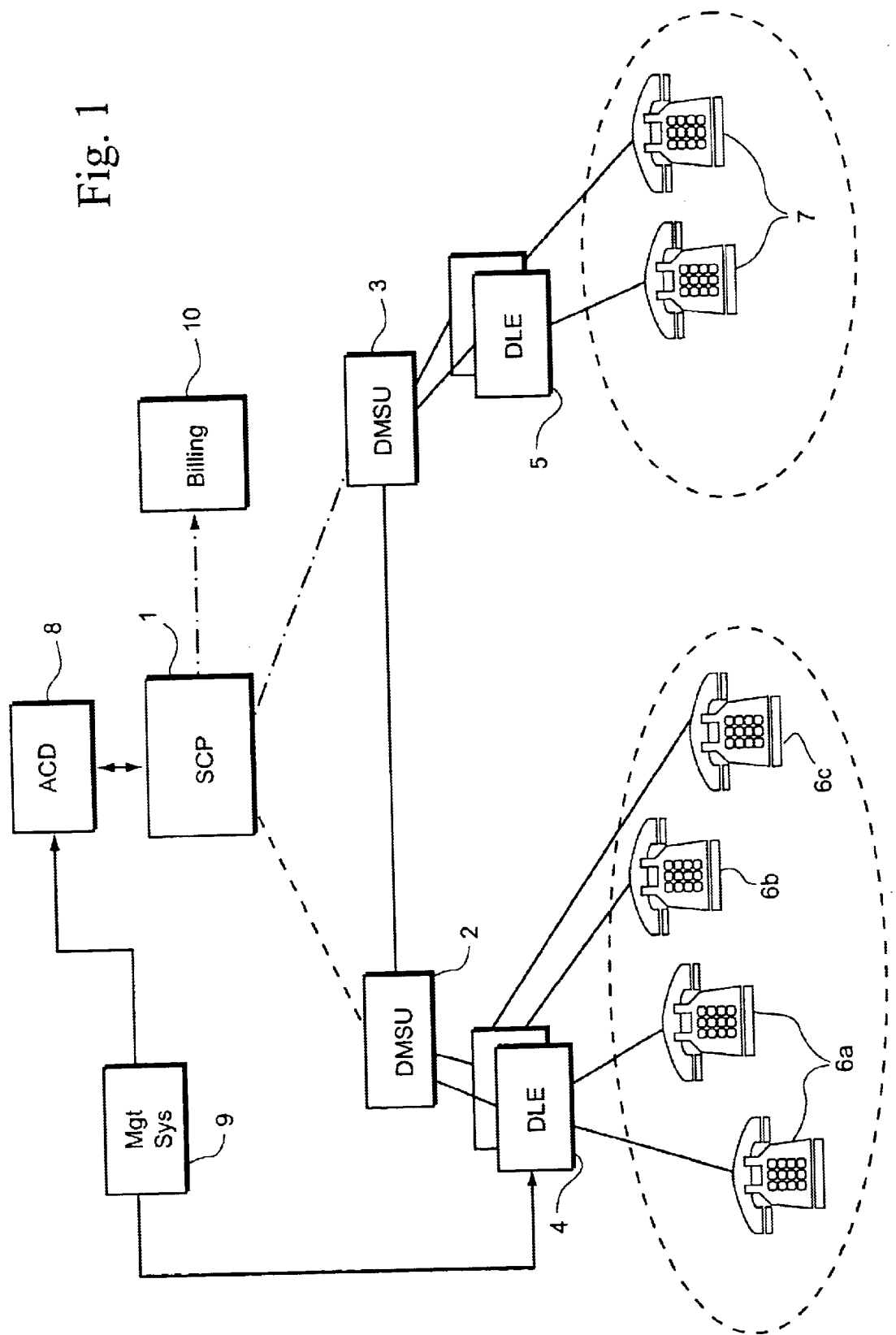
FIG. 1 is a schematic of a network suitable for use with the present invention.
Figure 4:
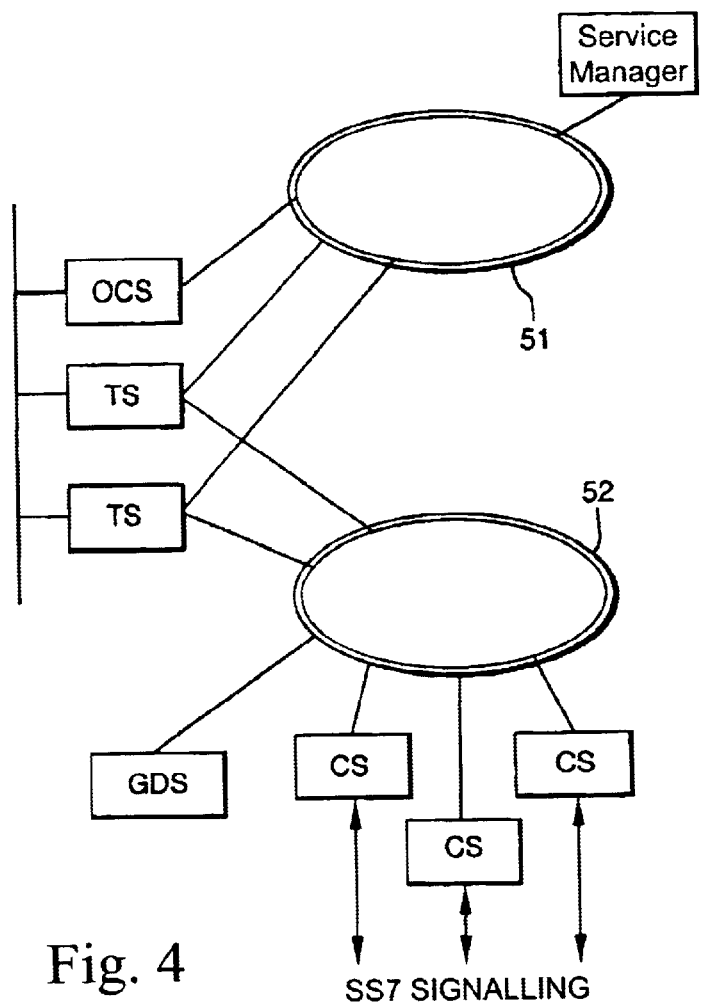
FIG. 4 shows the architecture of a service control point.

FIG. 1 shows a telecommunications network employing an IN (Intelligent Network) architecture. A service control point (SCP) 1 is connected via a common channel signalling network to digital main switch units (DMSU's) 2 and to digital local exchanges (DLE's) 3. A suitable architecture for the service control point is shown in FIG. 4. The digital main switch units and digital local exchanges may be commercially available systems such as Ericsson's AXE10 or GPT's System X exchanges. These exchanges include a short code dialling facility.

A number of subscriber terminals, for example telephones, are connected to the local exchanges. A first group of subscriber terminals 6 are located in one geographical region, for example within one metropolitan area, and a second group of terminals 7 are located in another region. Although for ease of illustration only a few terminals are shown, in practice each group may include some thousands of subscriber terminals. Within the first group of subscriber terminals, some terminals, referenced 6a, fall in a first subscriber category (for example, domestic subscribers) and have the pre-programmed short dialling service provisioned. Other terminals, referenced 6b, fall into a different subscriber category (for example, payphones in public houses) and have the pre-programmed short dialling service provisioned. A third group of terminals, referenced 6c do not have the short dialling service provisioned.

The pre-programmed short code dialling service is implemented using an automatic call distribution platform (ACD) 8. The ACD platform 8 is connected to the service control point 1, and to a management platform 9. The ACD platform carries out number translation for the short codes using a dialling plan. The ACD platform carries out number translation of the type conventionally used, for example, for free-phone (0800) numbers. This approach to implementing the invention is preferred since it facilitates access to the relevant service features by parties other than the network operator. Alternatively, it is technically possible for the local exchanges to be programmed directly with the final destination numbers corresponding to the short dial codes, in which case the use of the ACD platform is dispensed with.

Billing events are notified to a billing platform 10 from the service control point 1. The billing events distinguish between, for example, calls from terminals in group 6a, and calls from terminals in group 6c, and cause a lower billing rate to be applied to the former.

Figure 2:
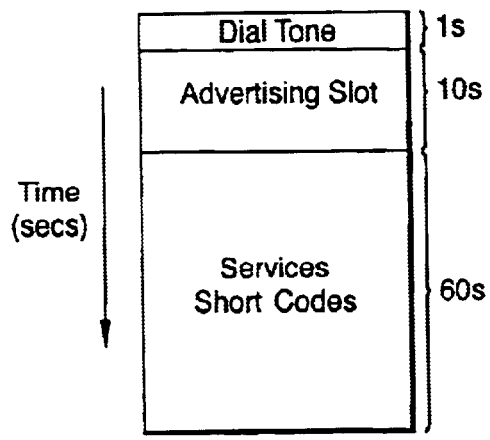
FIG. 2 is an example of a timing diagram for an off-hook signal.

In operation, calling plans for those customers for whom the short code dialling service is provisioned are stored in the ACD platform 8. When one of these customers picks up their telephone handset they hear first a short period of the standard dial tone. This is followed by announcements played in-band to the customer from their local exchange. These announcements include identification of the relevant short codes together with advertisements for goods or services associated with one or more of the short codes. FIG. 2 shows examples of the service timings. In this example, the standard dial tone is followed by a single advertising slot which would be broadcast in a pre-determined and cyclical nature along with many other advertisements of identical period—but only one per slot. After the advertisement slot, all shortcodes would be announced along with corresponding reference to their respective services. The first short code should hold the number of the advertiser from the advertisement slot. The remaining short codes are numbers associated with services, both local and national. Some of these remaining short codes should be fixed such they are not only locally defined, but provide a national standardised reference to specific services within any locality (e.g. for Taxis). Therefore, whenever any customer travelled around the country, a local service could be called immediately without prior research by simply dialling the nationally standardised short code associated with such a service.

Figure 3:
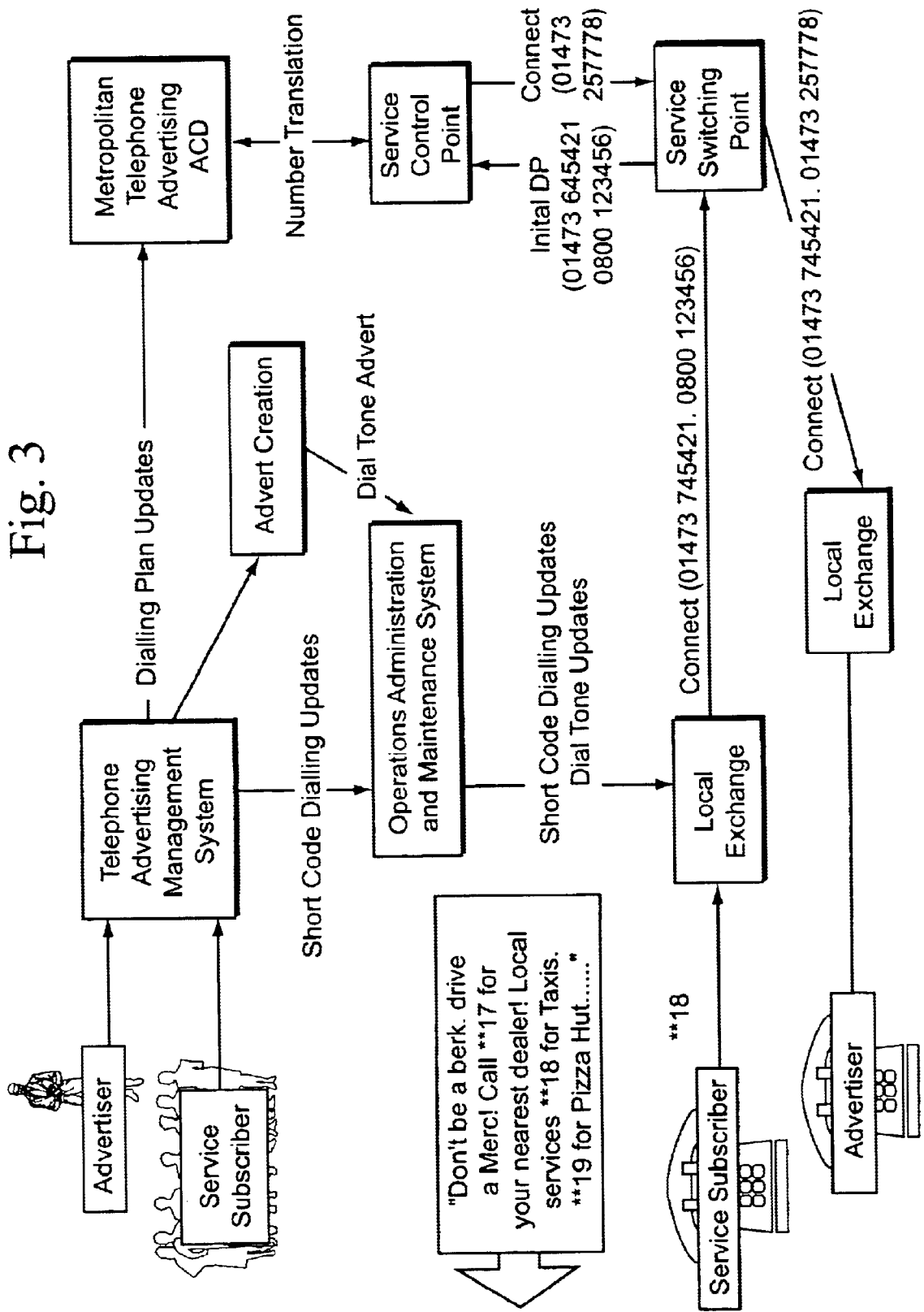
FIG. 3 is a schematic showing the signal flows when the invention is implemented on the network of FIG. 1.

Finally, the advertisement followed by short code reference is repeated cyclically whilst the handset is raised. FIG. 3 shows in further detail an implementation of the service outlined above. In this implementation, the ACD platform is termed the metropolitan telephone advertising ACD, and the management system is termed the telephone advertising management system (TAMS). Both advertisers and service subscribers interface via customer service agent to the Telephone Advertising Management Systems (TAMS). The TAMS is operated by the telephony advertising (TA) service provider.

The TAMS system operates on a metropolitan basis, that is to say it provides services tailored to a particular metropolitan region. The system performs the following functions: creates short code dialling updates for all metropolitan subscribers in accordance with the advertisers' wishes; creates dialling plan updates for the metropolitan Automatic Call Distribution (ACD) platform; manages the recording and the deployment to all local exchanges of the dial tone advertisement. The short code updates are sent to the operations, Administration and Maintenance System within the network operator's domain. The short codes are then fed into the correct user accounts on the local switches. The relevant user accounts are determined by the TAMS system. For example, the system may store a list of subscribers within group 6a and another list of subscribers within group 6b. The relevant local exchanges are instructed to play one advertisement and group of short code identifications to subscribers in the first group, and a second advertisement and group of short code identifications to the subscribers in the second group.

The Metropolitan Telephone Advertising ACD (MTAA) platform runs a set of Intelligent Network applications that provide the necessary number translation of the short code dialling 0800 numbers into local and national services. The MTAA applications are defined by the telephone advertising service provider, but run on the network operator's Service Control Point.

In the example illustrated in FIG. 4, when the user picks up the telephone, they hear 1 second of dial tone followed by a 10 second advertisement, followed by a list of local or national services followed by the appropriate short code to press to access that service. In this case the dial tone offers, e.g., the option of pressing 18 for a Taxi. The user then dials 18. The short code dialling feature at the local exchange looks up the telephone number and dials the corresponding number, which in this case is a freephone number, 0800 123456. Different 0800 numbers may be generated depending on the short code dialled by the user. This number is passed to a DMSU which functions as a Service Switching Point (SSP). The SSP creates an initialDP message (INAP) giving the calling and the called freephone number. These are translated by the MTAA application into a physical number which is the advertiser's local number. The SSP is then instructed by the Connect message to route the call to that number, which in this example is 01473 257778. Although in this case the number is on the same local exchange as the user, this is not necessarily so.

FIG. 4 shows a possible architecture for an SCP, termed here the Network Intelligence Platform (NIP). A service management server is connected via an FDDI optical fibre LAN 51 to an overload control server (OCS) and to transaction servers (TS). The transaction servers implement advanced service control functions. The OCS and transaction servers are connected via a second FDDI LAN 52 to communications servers (TS) which are connected to the SS7 (ITU Signalling System no. 7) signalling network.

Although in this example, the invention is implemented using a fixed wire network using an IN architecture, it will be understood that a wide variety of different architectures may be used in implementing the invention. For example, the subscribers may use mobile cellular terminals communicating with local base stations.

As a further alternative, the management and number translation services may be carried out by computing platforms e.g. a service node located at the edge of the network, instead of using SCP's and associated peripherals as in the example above. In this case, a user from any network could call an edge of network number, either via an 0800 number followed by number translation or directly. Once through to the service node an advertisement is played to the user which contains the same content as the dial tone in the example above. After the advertisement, DTMF (dual tone multi-frequency) or speech signals can be sent by the calling user to select the desired advertiser.

Figure 5:
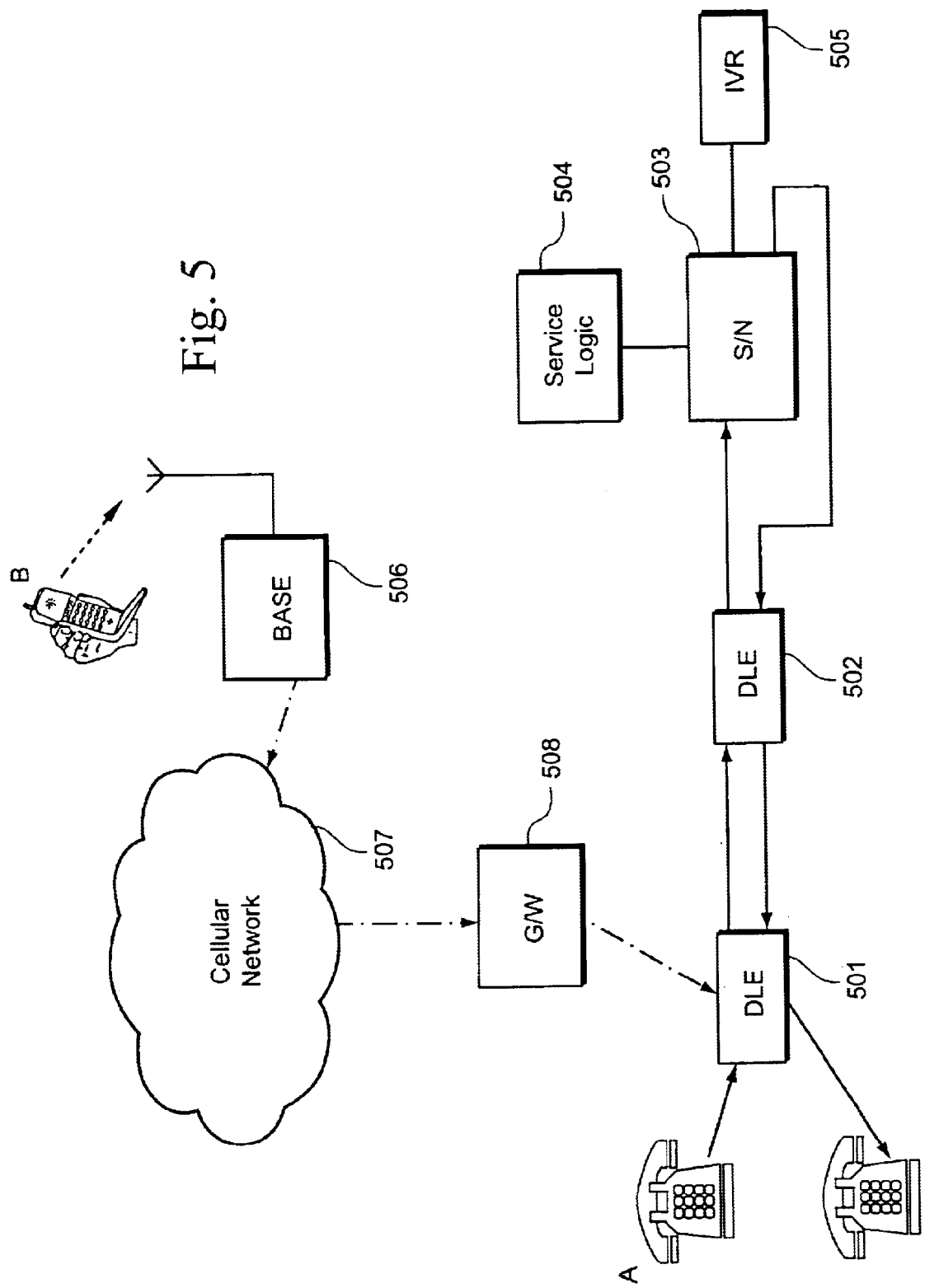
FIG. 5 shows a second example of a network embodying the invention.

FIG. 5 shows the structure of a network operating using a service node, as described above. A user at location A, for example, dials the number of the service provider, and is connected via intermediate local exchanges 501, 502 to the service provider node 503. The calling line identity (CLI) of location A is passed to the node with the incoming call. The node 503 then answers the call. Service logic 504 at the node uses the CLI to address a look-up table which maps CLI's to geographical locations and subscriber categories. The node selects and plays to the caller an announcement corresponding to the callers location and category. The announcement offers a menu of short dialling codes. These may then be dialled by the user and transmitted to the node as DTMF tones, or may be spoken by the user. Speech is recognised and translated at the service node by an IVR (interactive voice recognition) platform 505. In response to the selection by the user, for example of short code ** 18, the service node makes a call out to the corresponding number—01473 257778— and the call from location A is connected through to that number. The call may be made by tromboning the call the service node, or take back and transfer may be effected by the node releasing the call from A, dialling a network control platform and communicating the corresponding number, and the network switch, which has held the incoming leg of the call from A, establishing a leg from the switch to the corresponding number. This take back and transfer method is described and claimed in the present applicant's co-pending British and European patent applications filed 20th Mar. 1998 Applicant's reference A25540, title "Communications Network", the contents of which are incorporated herein by reference.

The example of FIG. 5 also illustrates the use of a mobile terminal. The user at location B dials the service provider number of node 53. The call is passed via the local base station 506, mobile cellular network 507 and mobilePSTN gateway 508. It is then routed on to the service provider node 503. In this case, cell location data is passed together with the CLI, and the service logic at the node 503 uses both the cell location data and the CLI in addressing a look-up table to determine the appropriate announcements to be played to the caller. In other respects, the call is handled as described above for the fixed line caller.

What is claimed is:

1. A method operating a telecommunications network including:
   (a) in response to instructions from a second party remote from a subscriber terminal, pre-programming the network to respond to one or more short dialling codes from the subscriber terminal,
   (b) communicating, in the absence of an in-progress call, to the subscriber terminal data identifying the allocation of short dialling codes pre-programmed in step (a); and
   (c) subsequently initiating a call from the subscriber terminal by dialling one of the short codes.

2. A method according to claim 1, in which step (b) includes communicating the data to the subscriber terminal in an off-hook signal.

3. A method according to claim 2, in which the data includes a paid-for advertisement for goods or services accessed by a telephone number corresponding to one of the short dialling codes.

4. A method according to claim 3, further comprising generating network billing record at a reduced billing rate for calls made from the subscriber terminal.

5. A method according to claim 1, in which the data is communicated to the subscriber terminal as an in-band audio announcement.

6. A method according to claim 1, in which the step of pre-programming the network includes programming translation platform remote from the subscriber terminal with a plurality of different short dialling code allocations for a plurality of different subscriber terminals.

7. A method according to claim 1, including pre-programming a common group of short dialling codes for a plurality of subscriber terminals in a common geographical region.

8. A method according to claim 1, in which the step of pre-programming the network includes storing data determining the allocation of short codes at a service node a located at the edge of the network.

9. A method according to claim 8, in which the user first initiates a call to the service node, and the service node answers the call and communicates to the user the data identifying the allocation of short codes.

10. A method according to claim 1 wherein communicating to the subscriber terminal data in step (b) comprises communicating to a user of a subscriber terminal an off-hook signal which identifies the allocation of the short dialling codes.

11. A method of operating a telecommunications network including:
   (a) in response to instructions from a second party remote from a subscriber terminal, pre-programming the network to respond to one or more short dialling codes from the subscriber terminal;
   (b) communicating, in the absence of an in-progress call, to the subscriber terminal data identifying the allocation of short dialling codes pre-programmed in step (a); and
   (c) subsequently initiating a call from the subscriber terminal by dialling one of the short codes;
   the step of pre-programming the network includes programming a number translation platform remote from the subscriber terminal with a plurality of different short dialling code allocations for a plurality of different terminals; and
   transmitting from a management platform to the number translation platform instructions for determining the allocation of short dialling codes, and transmitting from the management platform to a local exchange the data identifying the allocation of short dialling codes for a respective subscriber terminal.

12. A method of operating a telecommunications network including:
   (a) in response to instructions from a second party remote from a subscriber terminal, pre-programming the network to respond to one or more short dialling codes from the subscriber terminal;
   (b) communicating, in the absence of an in-progress call, to the subscriber terminal data identifying the allocation dialling codes pre-programmed in step (a);
   (c) subsequently initiating a call from the subscriber terminal by dialling one of the short codes; and
   pre-programming different short dialling code allocation for different respective groups of subscribers in different subscriber categories.

13. A method according to claim 12, in which the off-hook signal comprises an in-band audio announcement.

14. A communications network including:

(a) means responsive to instructions from a second party remote from a subscriber terminal for pre-programming the network to respond to one or more short dialling codes from the subscriber terminal, (b) for communicating the absence of an in-progress call, to the subscriber terminal data identifying the allocation of short dialling codes pre-programmed by the means responsive to instructions from a second party; and (c) means responsive to a short code subsequently selected by the subscriber for connecting the subscriber to a destination number determined by the allocation of short dialling codes.

15. A network according to claim 14, in which the means for communicating arranged to generate an off-hook signal containing the data.

16. A method of operating a telecommunications network, the method comprising:

(a) in response to instructions from a second party remote from a subscriber terminal, pre-programming the network to respond to one or more short dialling codes from the subscriber terminal;

(b) communicating to the subscriber terminal a dial tone, the dial tone offering data identifying the allocation of short dialling codes pre-programmed in step (a); and (c) subsequently initiating a call from the subscriber terminal by dialling one of the short dialling codes.

17. A telecommunications network comprising:

(a) means responsive to instructions from a second party remote from a subscriber for pre-programming the network to respond to one or more short dialling codes from the subscriber terminal;

(b) means for communicating to the subscriber terminal a dial tone, the dial tone offering data identifying the allocation of short dialling codes pre-programmed by the means responsive to instructions from a second party; and (c) means responsive to a short code subsequently selected by the subscriber for connecting the subscriber to a destination number determined by the allocation of short dialling codes.

\* \* \* \* \*